Sept. 14, 1965 F. F. LEE ETAL 3,206,737

SKEW CORRECTING CIRCUIT

Filed March 21, 1961 6 Sheets-Sheet 1

INVENTORS
LAWRENCE F. HARRISON
FRANCIS F. LEE

BY Griffin and Stokes

ATTORNEYS

Sept. 14, 1965 F. F. LEE ETAL 3,206,737

SKEW CORRECTING CIRCUIT

Filed March 21, 1961 6 Sheets-Sheet 2

Sept. 14, 1965 F. F. LEE ETAL 3,206,737

SKEW CORRECTING CIRCUIT

Filed March 21, 1961 6 Sheets-Sheet 3

SKEW CORRECTING CIRCUIT

Filed March 21, 1961

6 Sheets-Sheet 4

Sept. 14, 1965 F. F. LEE ETAL 3,206,737

SKEW CORRECTING CIRCUIT

Filed March 21, 1961 6 Sheets-Sheet 5

United States Patent Office 3,206,737

Patented Sept. 14, 1965

3,206,737

SKEW CORRECTING CIRCUIT

Francis F. Lee and Lawrence F. Harrison, Norristown, Pa., assignors to Sperry Rand Corporation, New York, N.Y., a corporation of Delaware Filed Mar. 21, 1961, Ser. No. 97,353
19 Claims. (Cl. 340—174.1)

This invention relates to skew correcting circuits for the realignment of signal pulses read from a plurality of parallel channels of a storage medium, and more particularly, to apparatus providing buffer means for each channel to store a number of signal pulses successively read therefrom.

Information is often recorded on webs or tapes, thereby to provide temporary or permanent storage of the said information. Such information may, for instance, be recorded as magnetized spots, as holes in a web, or as optically observable marks; and in the process of recording, the web or tape is caused to pass adjacent a recording transducer whereby the transducer impresses the desired information on the web.

In many forms of information systems, this recording of information is accomplished in plural channels on the tape or web, and one of the major problems present in such a plural channel recording system is the maintenance of a constant spatial relationship between the recorded pulses. One method of achieving this constant spatial relationship is to utilize a multiple channel head comprising a plurality of spaced individual transducers in conjunction with a recording medium such as a magnetic tape; and such an overall recording system is capable of high speeds of operation while satisfying the requirement of constant spatial relationship between pulses.

When such a multichannel recording system is employed, a further problem is ordinarily presented, and this further problem comprises the maintenance of a constant relationship between the multichannel head and the tape itself. In recording systems of the type described, the storage member or tape is ordinarily caused to pass between guides adjacent the opposed sides of a recording head or transducer; and these guides function to assure, as nearly as possible, a predetermined positional relationship between the transducer and tape during the recording or reproducing step. In practice, however, it has been found that due to variation of tape width during manufacture, or due to wear on the tape guides, to warp and camber of the tape, and/or to distortion of the tape edge or guides, it is extremely difficult to achieve a perfectly constant spatial relationship between the tape and transducer. Inasmuch as the guides must be set to accommodate the greatest possible width of tape so that binding of the tape in the guides will not occur, the tape many be subject to some angular variation in the guides as it passes adjacent to the transducer. This possible angular variation of the tape relative to a recording or reproducing transducer is commonly known as tape "skew," and such skew may in fact be cumulative between an original recording operation and a subequent reproducing operation, or when a tape recorded on one machine is read on another machine. Such skew, of course, poses one of the major difficulties encountered in multichannel systems of the type described, in that time misalignment of the plural recording or reproducing channels can occur; and the way in which this time misalignment may in fact occur cannot be predicted and will not be repeated from pass to pass.

It is therefore an object of the present invention to provide means whereby pulse groups recorded at high densities may be synchronized and realigned when sensed even though one or more of the pulses in different groups are arranged in overlapping patterns.

Another object of the present invention is to provide means for determining when all component members of a pulse group have been sensed to thereby immediately make said group available for further use.

A further object of the present invention is to provide a skew correcting apparatus for the same units of a multichannel recording system, wherein a plurality of buffer register stages are provided for each cannel having both parallel read-in thereto and read-out therefrom.

Yet another object of the present invention is to provide skew correcting apparatus for the sense units of a multichannel recording system, wherein a plurality of buffer register stages are provided for each channel having parallel read-in thereto and serial read-out therefrom.

These and other objects, advantages, and operation of the present invention will become apparent from the following description which is to be taken in conjunction with the accompanying drawings, in which.

Figure 9:
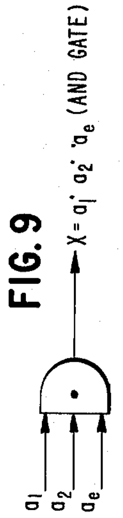
Figure 10:
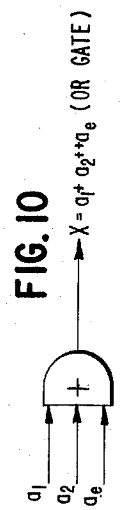
Figure 11:
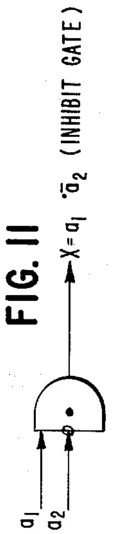

FIGURES 9, 10, and 11 show and explain the symbols representing certain logical gates used in the invention.

Figures 1, 2:
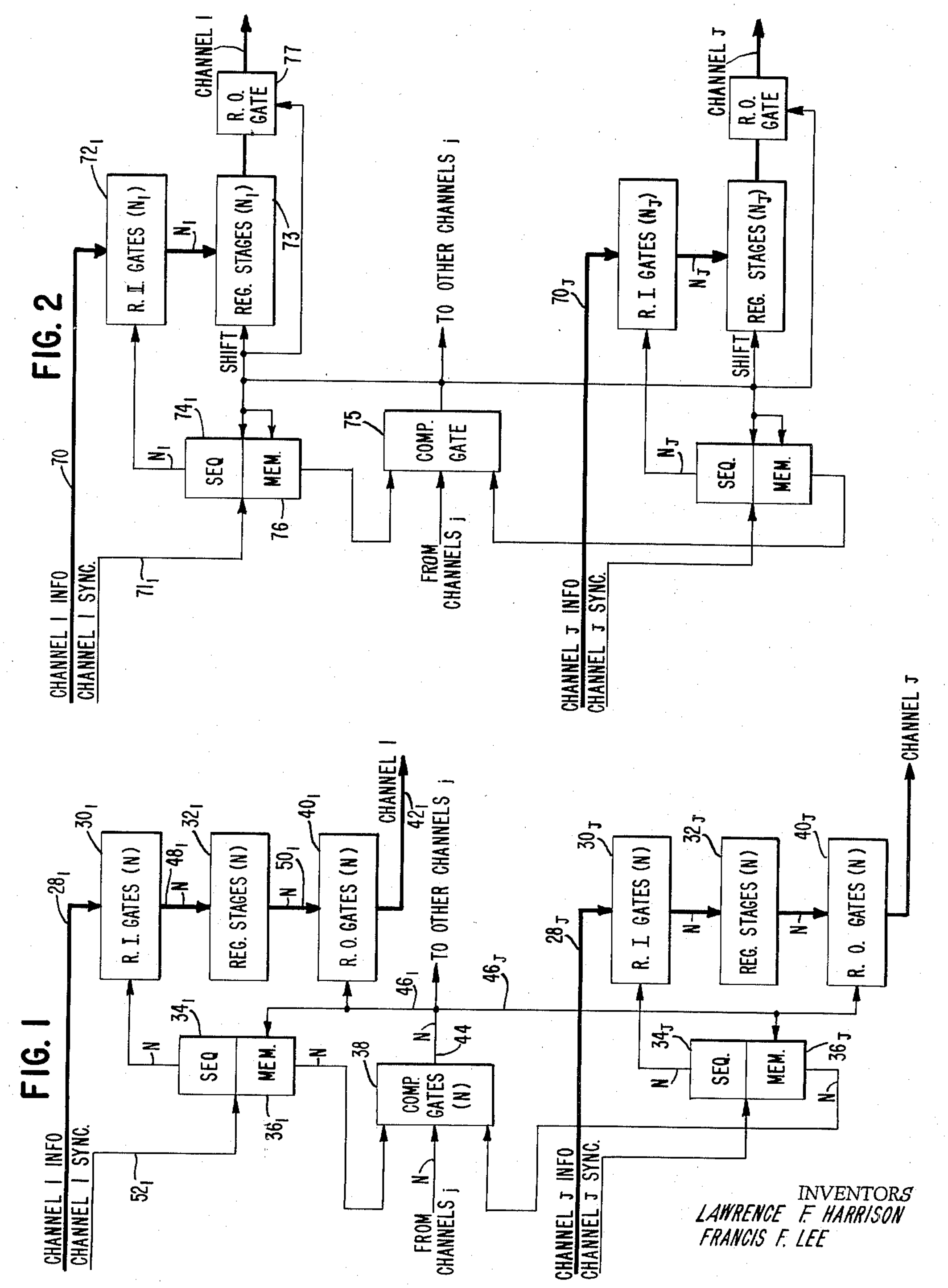
FIGURE 1 shows in block form an embodiment of the invention having one mode of operation.
FIGURE 2 shows in block form an embodiment of the invention having a slightly different mode of operation from that shown in FIGURE 1.
Figure 3:
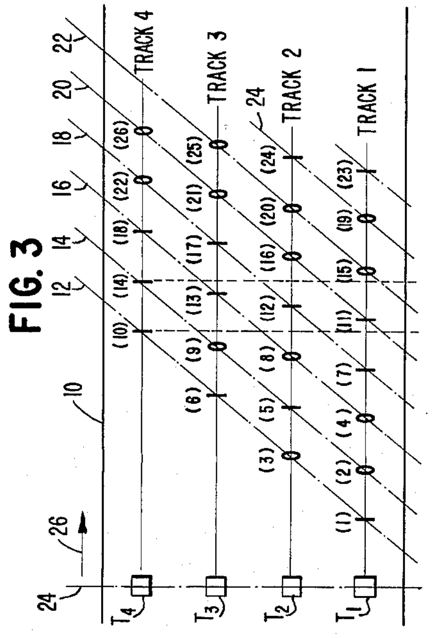
FIGURE 3 illustrates a typical pulse pattern on a storage medium, together with a group of transducers skewed thereto.

FIGURE 1 of the drawings shows in block diagram form the information and control signal paths within one embodiment of the present invention. The general description of FIGURE 1 is to be taken in conjunction with FIGURE 3, which shows the skewed relationship of a number of information characters whose binary bits are contained in parallel tracks on an elongated information storage medium 10, such as magnetic tape or the surface of a rotating magnetic drum. FIGURE 3 shows a typical store arrangement having four information tracks, each track storing corresponding order binary bits of a plurality of successive characters recorded on the medium, to be sensed or read by a corresponding tranducers $T_1$ through $T_4$ positioned adjacent each track. For example, track 1 of the storage medium may contain each binary bit of the characters having the binary order significance of $2^0$. Tracks 2, 3, and 4 each contain binary bits of the successive characters having respectively the binary order significance of $2^1$, $2^2$, and $2^3$. The tracks shown in FIGURE 3 may have binary order significance other than that described, and the number of tracks thereshown may obviously be expanded or reduced, depending upon the number of unique characters to be stored. Transducers $T_1$–$T_4$ are positioned adjacent their respective tracks 1–4 so as to sequentially sense the binary bits found therein and convert same to electrical signals for use in the circuits hereafter to be described. In the event that the storage medium is of a magnetic nature, then the value of a binary bit stored thereon may be indicated by the direction of polarization of an incremental area of said medium, depending upon whether the binary bit value is a 1 or 0. On the other hand, many magnetic recording systems indicate a binary 1 bit by magnetization of an incremental area, while a binary 0 bit is indicated by the absence of magnetization. If other storage media are utilized, such as punched tape or cards, then the presence of a perforation may indicate a binary 1. This invention is therefore not limited to any particular storage media or transducing system, but is useful wherever the bits comprising a character are in parallel but are not simultaneously sensed by all of the transducers associated with the information tracks.

In reading parallel channels from a record member, the reading transducer may not remain in the same fixed angular relationship with respect to said member as did the writing transducer. A change in this angular relationship between writing and reading therefore causes the parallel bits of a character to be read in skewed fashion, i.e., not simultaneously. FIGURE 3 shows an extreme example of character skew. The four binary bit positions astride the center line 12 comprise a character which is to be sensed by the transducers $T_1$–$T_4$. In like fashion, the four binary bits astride center lines 14, 16, 18, 20, 22, etc., comprise successive four bit characters which are to be sequentially sensed by the transducers. However, as may be observed from an examaination of FIGURE 3, the center lines 12, 14, etc., are not parallel to the center line 24 of the transducer array. Assuming that relative motion between the transducers and the recorded characters is as indicated by arrow 26, it will be noted that the four bits comprising the character of center line 12 will not be simultaneously sensed by all of the transducers. For example, the track 1 binary bit of character 12 will be sensed prior to the sensing of the track 4 bit of character 12, with the track 2 and track 3 bits of character 12 being sensed in that order at times intermediate. In like fashion, the track 1 binary bit of character 14 is sensed prior to the sensing of its track 2, 3, and 4 binary bits, with the track 4 bits being the last to pass beneath its respective transducer $T_4$. Furthermore, FIGURE 3 illustrates a skew angle, i.e., that angle formed between the transducer center line 24 and the character center lines 12, 14, etc., which is great enough to result in the sensing of information binary bits of succeeding characters prior to the sense of the track 4 bit of a reference character. For example, when considering the character 12, it will be seen that the following information bits of succeeding characters are sensed prior to the sensing of the track 4 binary bit of character 12: the track 1 bits of characters 14, 16, and 18; the track 2 bits of characters 14 and 16; and the track 3 bit of character 14. In like fashion, when considering character 14 as a frame of reference, certain binary bits of characters 16, 18, and 20 will be sensed prior to the sensing of the character 14 track 4 bit. The decimal numbers found in parenthesis above each of the binary positions on medium 10 represent the sequence in which a particular binary bit is sensed by the array of transducers $T_1$–$T_4$. Thus, it will be noted that the track 1 bit of character 12 is the first to be sensed, followed by the track 1 bit of character 14, the track 2 bit of character 12, the track 1 bit of character 16, etc. FIGURE 3 shows an example whereby two or more information bits in two or more tracks are not sensed simultaneously by their respective transducers. However, it can be appreciated that a change in the skew angle may result in such a situation. Furthermore, it is to be noted that the binary bits comprising a character may not be recorded exactly on the character center line, but instead may fall to one side or the other thereof so as to result in a somewhat irregular pattern on the storage medium. The configuration shown in FIGURE 3, therefore, is implified for the purposes of the following description. However, the invention to be described may be employed in situations such as those discussed above without impairment of efficiency or operation.

Returning now to FIGURE 1, the information bit signals from each of the track transducers shown in FIGURE 3 are applied to respective channel input conductors after passing through amplifiers and the like, said channel input conductors being represented by the dark face lines. Control signals are transmitted via conductors shown in light face lines so as to distinguish them from the flow paths along which the binary bit information from FIGURE 3 is transmitted. In FIGURE 1, only the first and last information channels are shown, with it being understood that there are as many information channels as there are parallel tracks on the storage medium being sensed. Furthermore, in order to show a more general system which may be used with a varying number of tracks, the first and last channels shown in FIGURE 1 are indicated as channel 1 and channel J, respectively, where the value of J is equal to the total number of channels present in the system. For sensing a storage medium having four tracks, therefore, J represents the value 4. All components are duplicated in each channel and have channel designating subscripts.

Referring specifically to the channel 1, it will be noted that the input conductor is connected to a plurality of read-in gates 30 which selectively direct a binary bit of information appearing thereon to one of a plurality of register storage stages 32. Since the binary bits transmitted to the channel 1 information conductor appear thereon in serial fashion, i.e., one behind the other, there will be only one information bit at any one time presented to the group of read-in gates 30. The selective conditioning of but one of the gates 30 is accomplished by a sequence circuit 34. After each binary bit has been inserted in one of the register stages 32, the sequence circuit 34 is changed so as to condition a different gate in group 30 to pass a subsequent information bit to a different register stage 32. Thus, as each information bit from track 1 appears on the channel 1 input conductor, it is placed in a respective register stage 30 and there awaits a readout signal, which only occurs when all of the bits of the character of which it is a part have been sensed by the transducers and placed in a respective register stage in each channel.

As each register stage 32 is filled with an information bit, one of a group of memory circuits 36 is actuated to indicate that the register stage has information therein. When a correspondingly numbered register stage in each of the channels has been filled, which occurs when every bit of a character has been sensed, then one of a group of comparison gates 38 detects equality of outputs from correspondingly numbered memory circuits 36 in all channels, in order to readout from the channel register stages the bits comprising a particular character. For this purpose, a group of read-out gates 40 are provided in each channel, with each read-out gate being associated with one of the register stages. The signal generated by a comparison gate in group 38 is applied only to a corresponding read-out gate in each channel so that only one register stage in each channel contains a bit of the same character. Therefore, even though a large skew angle results in the information bits of a particular character being read at widely varying times, with bits of succeeding characters being read at times intermediate, the output bits appearing on the channel conductors 42 all belong to the same character. Those information bits belonging to successive characters, which are read prior to the reading of the last information bit of a reference character, are stored in respective register stages of the channels until the entire character is stored in the skew correcting circuits, afterwhich it is read and transmitted via conductors 42 to utilization circuitry not shown.

As shown in FIGURE 3, for example, four bits on track 1 are read prior to the sensing of the first bit on track 4. Thus, assuming that the system of FIGURE 1 contains four skew channels, it will be noted that four register stages of group $32_1$ will be filled prior to entry of an information bit into a register stage of group $32_4$. It is therefore seen that the first bit from track 1 must be stored together with the three following track 1 bits until the first bit of track 4 is placed into a register stage of group $32_4$. In addition, register stages in channels 2 and 3 (not shown) have also been filled with binary bits from tracks 2 and 3. After the first bit of track 4 is placed in its proper channel 4 register stage, then the first bits of tracks 1, 2, 3, and 4 may be read from their respective channel register stages, and these stages reset to await entry of a new information.

Each channel contains the same number N of register stages, which number depends upon the maximum number of information bits that any one of the channels must store between the times that read-out operations occur therefrom. In one species of FIGURE 1, the value N is equal to maximum number of skew bits. In a second species of FIGURE 1, the value N is equal to the maximum number of skew bits plus 2. Therefore, assuming that the information storage pattern of FIGURE 3 is being scanned where channel 1 must store 4 bits between read-out times, the first species of FIGURE 1 requires four register stages in each channel, while a second species requires six register stages in each channel. Therefore, the letter N is used in FIGURE 1 to indicate that its associated conductor is to be considered as a cable having N conductors therein. Thus, although the single input condenser 28 is applied to each of the N read-in gates 30, the output conductor 48 therefrom is to be considered as representing N conductors, each individual to one of the read-in gate outputs and individual to one of the N register stages 32. In like fashion, N output conductors 50 are individually connected between the register stages 32 read-out gates 40, whereupon of all of the outputs of read-out gates 40 are common to a single output conductor 42.

The means for stepping the sequence circuit 34 and setting memory units 36 may be provided by various schemes. The criterion here is to provide a synchronizing pulse to each channel each time that an information bit, whether binary 1 or binary 0, appears on the channel information input line 28. Each sync pulse causes a change in sequence circuit 34, and may also set a memory element. Synchronizing control pulses appearing on input conductor 32 may be generated from a synchronizing track associated with each individual information track on the storage medium. For example, in FIGURE 3, four synchronizing tracks (not shown) may be provided, each adjacent a respective one of the information tracks 1 through 4, in which appears a synchronizing 1 bit as at each information bit time. This scheme may be necessary where one of the two binary information values on the storage medium is represented by the absence of any mark thereon, or where certain non-return-to-zero recording procedures are used. In such case, a transducer $T_1$–$T_4$ will not generate a signal for one of the two binary bit values, but there will always be an indication in the adjacent synchronizing track for each value 0 or 1 which may be sensed by an adjacent synchronizing track transducer (not shown) such as to produce a signal on the sync conductor 32. Other schemes of generating synchronizing pulses for each binary bit time may be utilized, such as a variable frequency clock pulse generator whose repetition rate is adjusted by the frequency of the binary 1 bit signals read from the information track. Again, if binary 1 and 0 information bits are represented by oppositely polarized magnetic areas, then synchronizing pulses may be generated from the information signals.

Figure 4:
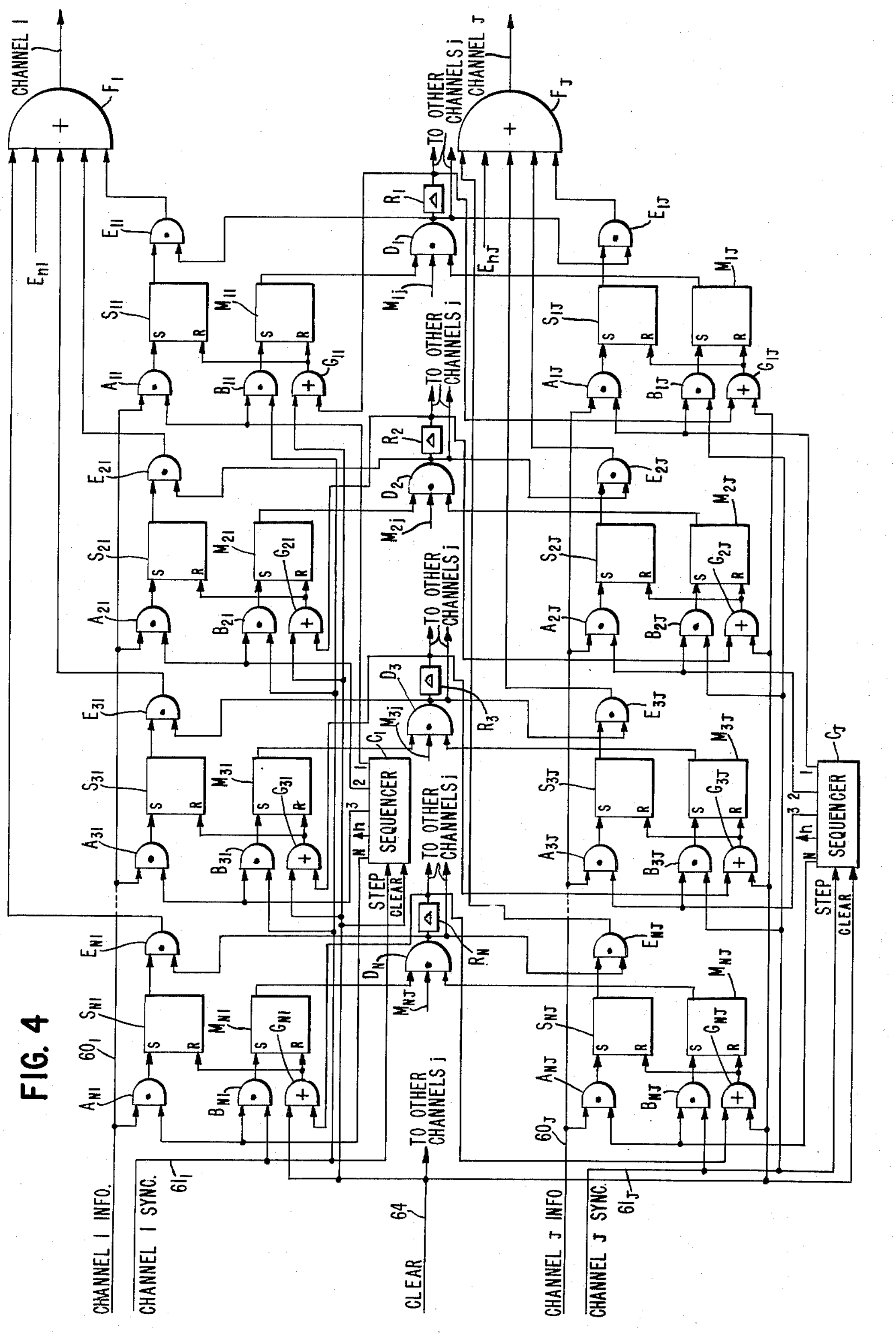
FIGURE 4 shows the details of a first species of FIGURE 1.

FIGURE 4 shows the details of one species of the present invention having a mode of operation such as indicated in the block diagram of FIGURE 1. In this embodiment, the number of register stages in each channel is equal to the maximum number of skew bits desired to be stored in any of the channels between character read-out times. The circuitry for only two channels, the first and the last, is shown in FIGURE 4, although it is to be understood that this circuitry is duplicated for each of the other channels. Subscripts are employed to identify a component $n$ in channel $j$. In this and other figures where logical circuitry is utilized, symbols are shown to represent gates having certain logical functions which are well-known in the data processing and computing art. For example, as illustrated in FIGURE 9, a semi-circle with a dot therein represents an AND gate, while FIGURE 10 shows a semi-circle with a plus sign therein representing on OR gate. An AND gate detects coincidence between input signals applied to every input terminal thereof to generate an output therefrom. An OR gate, on the other hand, generates an output if one or more input signals are applied to its input terminals. If the junction of an input terminal with its gate is enclosed by a circle, such as is shown in FIGURE 10, then a signal on this terminal acts to inhibit an output from the gate.

In FIGURE 4, the register stages in each channel may comprise a group of trigger circuits $S_{1j}$ through $S_{nj}$ each having set and reset input terminals respectively designated S and R. A signal is considered to appear on an output terminal from a trigger only if it is in its set condition. Other bistable storage means may be utilized and the invention is not to be limited by the structure specifically mentioned during the course of this description which is but exemplary of the art. Also associated with each register stage $S_{nj}$ is a bistable memory trigger $M_{nj}$ having set and reset inputs and an output on which appears a signal when the device is in its set state.

Information bits appearing on an input conductor $60_j$ are applied in common to a group of AND gates $A_{1j}$ through $A_{Nj}$ which in turn have outputs respectively connected to the said inputs of register stages $S_{1j}$ through $S_{Nj}$. However, a bit appearing on conductor $60_j$ cannot pass through an AND gate $A_{nj}$ unless the other input thereto has a signal applied thereon. The signals for conditioning each of the AND gates $A_{nj}$ are provided by a sequence circuit $C_j$ which may, for example, be a counter or a shift register. For each state $C_j$, one of its output lines $n$ has a signal applied thereto which conditions its associated AND gate $A_{nj}$ to pass whatever information bit is present at this time on conductor $60_j$. The circuit $C_j$ is stepped each time that a sync pulse appears on conductor $61_j$, so that each successive information bit appearing on conductor $60_j$ may be placed in different one of the register stages $S_{nj}$ in sequential order. Normally, the order of register stage filling proceeds from stage $S_{1j}$ through $S_{Nj}$, and then back to $S_{1j}$ again from whence the cycle repeats.

At the same time that circuit $C_j$ conditions a respective one of AND gates $A_{nj}$ to pass an information bit it also conditions a respective one of the AND gates $B_{nj}$ associated with the set input of the memory element $M_{jn}$. Each synchronizing pulse or conductor $61_j$ sets the memory element $M_{nj}$ which is associated with the register stage $S_{nj}$ being filled. Thus, each time a register stage $S_{nj}$ is filled with binary information, the corresponding memory element $M_{nj}$ is placed in its set condition.

It should be here noted that the embodiment shown in FIGURE 4 represents a binary 0 bit by the absence of a signal on conductor $60_j$, which at the same time is accompanied by a sync bit on a conductor $61_j$. For a binary 0 bit to be considered stored in a stage $S_{nj}$, said stage must be in its reset state. Practically, this is accomplished by initially resetting all of the stages $S_{nj}$, and then setting only those which must contain a binary 1 bit of information. When a binary 0 bit is to be stored, the register stage $S_{nj}$ having its AND gate $A_{nj}$ conditioned by circuit $C_j$ will remain in its reset condition. However, since a synchronizing pulse always appears on channel $61_j$ for each information bit position no matter what the bit value, the memory element $M_{nj}$ having its AND gate $B_{nj}$ conditioned by circuit C is thereby placed in its set condition to indicate that the associated register stage $S_{nj}$ has been filled.

A group of AND gates $D_1$ through $D_N$ are provided for comparing like numbered memory elements $M_1$ through $M_N$ in each of the channels 1 through J, to determine when all of the compared memory elements are in their set condition. For example, AND gate $D_1$ has an input for each of the memory elements $M_{11}$ through $M_{1J}$. These particular memory elements are those respectively associated with the first register stages $S_{11}$ to $S_{1J}$ in channels 1 through J. Thus, when all of the elements $M_{11}$ through $M_{1J}$ are in their set state, an output is generated from AND gate $D_1$ which indicates that register stages $S_{11}$ through $S_{1J}$ all contain information bits belonging to the same character. In like manner, AND gate $D_2$ determines when all of its associated memory elements $M_{21}$ through $M_{2j}$ are set, with gates $D_3$ through $D_N$ having similar functions for the remaining sets of memory elements.

The outputs from each of AND gates $D_1$ through $D_N$ are respectively applied to individual ones of a group of AND gates $E_{1j}$ through $E_{Nj}$ found in each channel. These gates are respectively associated with the outputs of individual ones of register stages $S_{1j}$ through $S_{Nj}$. The function of a gate $E_{nj}$ is to read-out the contents of its associated stage $S_{nj}$ and to apply same to one of a group of OR gates $F_1$ through $F_J$. For example, when a signal is generated from AND gate $D_1$, it is applied in common to all of the AND gates $E_{11}$ through $E_{1J}$ in order to sample the output terminals of respective stages $S_{11}$ through $S_{1J}$. If one or more of these stages have previously been set by a binary 1 bit, then the associated AND gate $E_{1j}$ will transmit a signal to the OR gate $F_j$ where it appears on the output thereof. If a register stage $S_{1j}$ is in its reset condition at the time read-out occurs, then no output appears on the associated OR gate $F_j$. This indicates that the stage $S_{1j}$ contains a binary 0 bit.

At approximately the same time that a signal from an AND gate $D_n$ is applied to the read-out gates of register stages $S_{nj}$ in each channel, the same signal is applied via a small delay $R_n$ and an OR gate $G_{nj}$ to the reset terminals of stages $M_{nj}$ and $S_{nj}$. This resetting operation is performed immediately subsequent to the read-out from the $S_{nj}$ stage in order to make available this $S_{nj}$ stage for storage of a subsequent binary information bit. Furthermore, associated memory element $M_{nj}$ is reset, thus indicating stage $S_{nj}$ to be empty, and will remain in this condition until circuit $C_j$ subsequently enters a new binary bit of information into stage $S_{nj}$. The delay $R_n$ may not be necessary if the switching time of a trigger is large compared to the read-out time therefrom.

Figure 6:
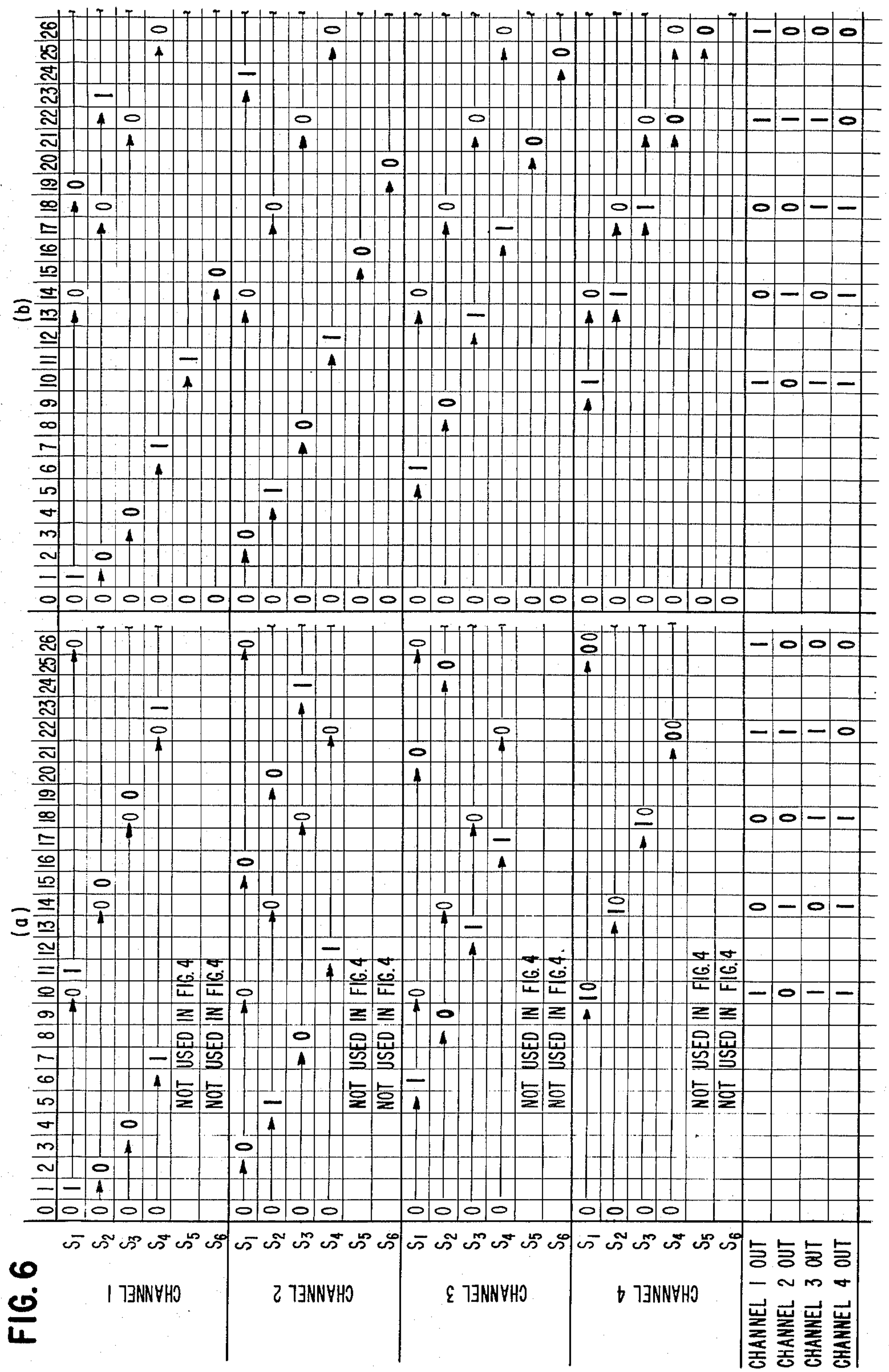
FIGURE 6 illustrates in tabular form the operation of FIGURES 4 and 5.

The operation of the embodiment shown in FIGURE 4 will now be described, with particular reference to part A of the chart of FIGURE 6. Part A indicates the contents of each of the register stages $S_{nj}$ at respective times during the skew correcting cycle when the particular binary bit configuration of FIGURE 3 is being sensed. In this case, there are only four channels in FIGURE 4, with each channel containing four register stages $S_{1j}$ through $S_{4j}$. The sequence in which information is placed therein is represented by the numerals 0 through 26 appearing horizontally above the chart. It will be noted that the numerals 0 through 26 appearing in the Part A of FIGURE 6 correspond to the sequence in which the individual bit positions are sensed in FIGURE 3. Furthermore, the bold face numerals in the body of the chart indicate the presence of binary 0 or 1 information bits (the stage being considered filled), while a light face numeral 0 indicates that a register stage is empty. Thus, although the reset condition of a register stage can signify two possible conditions, the distinction is evident in the chart of FIGURE 6. A horizontal arrow running from left to right is a short hand notation indicating that the condition of a register stage is that represented by the numeral immediately to the left of the arrow stem. Where the arrowhead extends into a numbered sequence block in which there is also a light face numeral 0, this indicates that the register stage is immediately reset to an empty condition during the latter part of the block interval.

It is assumed that in FIGURE 4 that a clear signal is initially applied via conductor 64 to reset all of the register and memory stages $S_{nj}$ and $M_{nj}$. All of the circuits $C_j$ are reset so that each energizes its output conductor 1. This conditions AND gates $A_{11}$ through $A_{14}$ in order that respective register stages $S_{11}$ through $_{14}$ may receive the respective track 1, 2, 3, and 4 bits of the first character 12 to be sensed by the transducers in FIGURE 3. The first bit sensed is that of character 12 in track 1, which is supplied by the channel 1 information conductor $60_1$ and passes through AND gate $A_{11}$. Since this bit is a binary 1, stage $S_{11}$ is set. A synchronizing pulse on $61_1$ likewise sets element $M_{11}$ and steps circuit $C_1$ to a state of 2. The second information bit sensed by the transducers is the track 1 bit of character 14, which is a binary 0. Although no signal at this time is applied to conductor $60_1$ a synchronizing pulse appears on $61_1$ to set element $M_{21}$ and step circuit $C_1$ to a state of 3. The third bit sensed by the transducers is the track 2 bit (0) of character 12, which fails to set $S_{12}$ but provides a synchronizing pulse to the channel 2 conductor $61_2$ (not shown in FIGURE 4) to set memory element $M_{12}$ and step circuit $C_2$ to a state of 2. In like fashion, the 4th, 5th, 6th, 7th, 8th, and 9th bits sensed by the transducers in FIGURE 3 are applied to their respective channels and register stages therein in a manner similar to that described above.

After the 9th bit has been sensed, which is the track 3 bit of character 14, memory elements $M_{11}$ through $M_{13}$ are now set, indicating that the track 1, 2, and 3 bits of character 12 are contained in register stages $S_{11}$ through $S_{13}$. However, no output signal is yet generated from gate $D_1$. Upon the track 4 bit (1) of character 12 being sensed by transducer $T_4$, register stage $S_{14}$ and memory element $M_{14}$ are both set, with circuit $C_4$ being stepped to a state of 2. AND gate $D_1$ now detects coincidence of outputs from all of the memory elements $M_{11}$ through $M_{14}$ so as to generate a signal therefrom. This signal gates out all four bits comprising character 12 from the respective register stages $S_{11}$ to $S_{14}$, and applies them to their respective output OR gates $F_1$ through $F_4$. At approximately the same time, register stages $S_{11}$ through $S_{14}$ and elements $M_{11}$ through $M_{14}$ have pulses applied to their reset terminals by AND gate $D_1$. As noted in FIGURE 6, Part A, the signals appearing from OR gates $F_1$ through $F_4$ at sequence 10 have the respective configuration 1011, thus representing the complete character 12 shown in FIGURE 3.

The 11th information bit sensed in FIGURE 3 is the track 1 bit of character 20, which may now be placed in the newly emptied register stage $S_{11}$. It will be noted that the 7th bit sensed in FIGURE 3 was previously placed in register stage $S_{41}$, whereupon circuit $C_1$ was stepped and recycled to its initial state of 1. However, it is seen that before this bit of character 20 can be placed in register stage $S_{11}$, the track 1 bit of character 12 must be read and $S_{11}$ emptied in order to prevent destruction of information. Therefore, at least four register stages are required in channel 1 when sensing the bit pattern in FIGURE 3. Because of the parallel read-out from correspondingly numbered register stages in each channel, each of the other channels also requires an equal number of stages, although it is evident that channel 4 will only have one of its register stages filled at a time when sensing a pattern like that in FIGURE 3. If the pattern changes, however, such that the direction of skew is reversed, then channel 4 may be required to store more bits than channel 1.

The operation of FIGURE 4 is deemed to be obvious in view of the above description, so that the further sensing and entry of information bits into the skew correcting channels will not be described in detail. As seen in FIG- URE 6, Part A, read-out from the register stages for characters 12, 14, 16, 18, 20, etc., occurs at respective intervals 10, 14, 18, 22, 26, etc.

Figure 5:
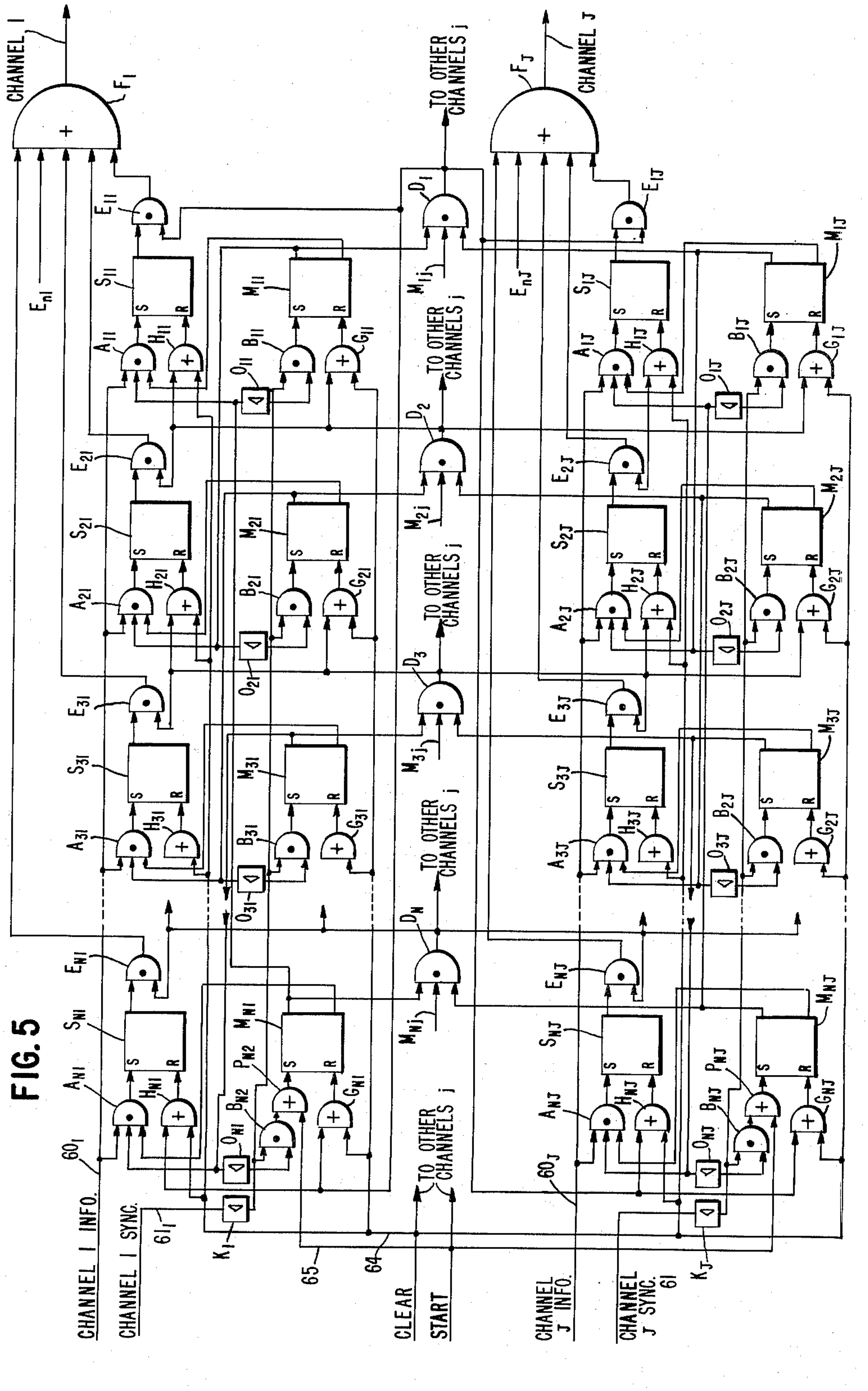
FIGURE 5 shows details of a second species of FIGURE 1.

FIGURE 5 of the drawings shows a slightly different arrangement from that in FIGURE 4, which avoids the use of the individual circuits C and thus is a more economic configuration when a large number information tracks and/or skew digits are encountered. In FIGURE 5, the use of N number of register stages $S_{nj}$ enable the correction of N−2 digits of skew. Those triggers and logical gates in FIGURE 5 which have functions similar to those in FIGURE 4 are indicated by corresponding letters and subscripts. Both set and reset output signals from the memory elements $M_{nj}$ are utilized, such that each element $M_{nj}$ has a role to play in its reset as well as its set condition. Thus, each memory element $M_{nj}$ has its reset output terminal connected to AND gate $A_{nj}$ of its corresponding register stage $S_{nj}$. Furthermore, the set output terminal of each memory element $M_{nj}$ is connected to AND gate $A_{(n+1)j}$ which in turn is connected to the set terminal of register stage $S_{(n+1)j}$. The set output terminal of $M_{nj}$ is also connected to AND gate $B_{(n+1)j}$ of memory element $M_{(n+1)j}$ through a small delay $O_{(n+1)j}$. For example, in channel 1 of FIGURE 5, the reset output terminal of element $M_{11}$ is connected to AND gate $A_{11}$, while its set output terminal is connected both to AND gate $A_{21}$, and through $O_{21}$ to the input of AND gate $B_{21}$. These two connections of the $M_{nj}$ element set output terminal are in addition to its connection with AND gate $D_n$. It will further be noted that the set output terminal of the last memory element $M_{Nj}$ in each channel is connected to the appropriate AND gates $A_{1j}$ and $B_{1j}$ of the $S_{1j}$ and $M_{1j}$ triggers, inasmuch as the value $(N+1)$ results in the value 1 because of the recycling action.

The purpose of the additional memory trigger connections in FIGURE 5 is to eliminate the need for individual circuits $C_j$ of FIGURE 4. This is accomplished by requiring each of the AND gates $A_{nj}$ to be conditioned by both the reset output of its associated memory element $M_{nj}$ and the set output of the memory element $M_{(n-1)}$ associated with the immediately preceding filled stage $S_{(n-1)}$. Furthermore, to set a memory element $M_{nj}$ requires that its associated AND gate $B_{nj}$ be conditioned by the set terminal of the immediately preceding memory element $M_{(n-1)}$. The use of the delay elements $O_{nj}$ is to insure that only one trigger $M_{nj}$ can be set by a sync pulse, inasmuch as this pulse may have a duration sufficient to overlap the signal appearing on the set output terminal of a memory element which it has itself set. Thus, if element $M_{11}$ is set by a particular sync pulse, the signal from its set output terminal will not arrive at AND gate $B_{21}$ until this particular sync pulse has disappeared. This insures that element $M_{21}$ will not be set until its associated register stage $S_{21}$ is filled with the proper information. It is also to be noted that a delay element $K_j$ can be provided in each channel sync conductor to insure that no switching of the memory elements is performed until after information has been placed into one of the register stages $S_{nj}$ via the information conductor $\mathbf{60}_j$. This may be necessary if the switching time of the triggers in quite rapid, because the set and reset state configurations of the memory elements must condition only one of the input AND gates $A_{nj}$ during the presence of an information bit signal in order to avoid the insertion of the same bit in two or more register stages. Although no delay such as $K_j$ has been shown in FIGURE 4, it is to be understood that such may be necessary for the same reasons.

Another difference in FIGURE 5 from that of FIGURE 4 is in the use of AND gates $D_n$ for resetting the register and memory elements. As shown in FIGURE 4, the output of each comparison gate $D_n$ is used to reset both its associated register stage $S_{nj}$ and memory element $M_{nj}$. However, FIGURE 5 shows that the output from each of the AND gates $D_n$ is used to reset register stages $S_{(n-1)}$ through $S_{(n-1)J}$, and elements $M_{(n-1)1}$ through $M_{(n-1)J}$. For example, the output from AND gate $D_2$ is applied to reset terminals of register stages $S_{11}$ and memory element $M_{11}$ via respective OR gates $H_{11}$ and $G_{11}$. The output from AND gate $D_1$ is likewise applied to reset $S_{N1}$ and $M_{N1}$. It will therefore be seen that a signal generated from AND gate $D_n$ is maintained until a signal is generated from the next higher AND gate $D_{n+1}$, at which time the memory elements $M_{n1}$ through $M_{nJ}$ are reset. As long as a gating signal from gate $D_n$ exists, the register stages $S_{(n-1)1}$ through $S_{(n-1)J}$ and elements $M_{(n-1)1}$ through $M_{(n-1)J}$ cannot be set. For this reason then, N pairs of register stages S and memory elements M are required to correct a maximum number of skew digits equal to N−2. If the circuit of FIGURE 5 is used to correct the skew of the bit pattern shown in FIGURE 3, in which the maximum number of skew digits is equal to 4, then each channel of FIGURE 5 must contain six register stages S and six associated memory stages M.

The operation of FIGURE 5 will now be described in detail with particular reference to the bit pattern in FIGURE 3 and part B of FIGURE 6. In FIGURE 6, part B is physically adjacent to part A so that the difference in operation between FIGURE 4 and FIGURE 5 may be appreciated, inasmuch as both circuits are used to correct skew in the same bit pattern. However, Part B also makes use of the register stages $S_5$ and $S_6$ in each channel, because of the requirement that six such stages are necessary to correct for four digit skew. The sequence intervals in part B of FIGURE 6 have the same significance as those shown in Part A of FIGURE 6, and refer to the sequence in which each information bit in FIGURE 3 is sensed by the transducer group. The dark face numbers indicate the value of the binary bit considered stored in each register stage during the operation, while the light face numerals 0 indicate that a register stage is considered empty. Initially, a clear pulse is applied via conductor 64 to reset all of the register and memory triggers in each channel. Then, a start pulse is applied via conductor 65, in order to set each of the memory elements $M_{61}$ through $M_{64}$ via respective OR gates $P_{61}$ through $P_{64}$. Although the setting of these particular memory triggers at this time provides an output from AND gate $D_6$ due to coincidence of all inputs thereto, no significant outputs are derived from read-out gates $E_{61}$ inasmuch as their associated register stages $S_{61}$ through $S_{64}$ are in their reset condition. The setting of triggers $M_{Nj}$ is necessary in order to condition AND gates $A_{11}$ through $A_{14}$ to pass the first information bit appearing on each of the information input conductors $\mathbf{60}_1$ through $\mathbf{60}_4$. Triggers $M_{11}$ through $M_{14}$ are in their reset state.

The first information bit to be sensed is the track 1 bit (1) of character 12 in FIGURE 3, which is applied to conductor $\mathbf{60}_1$ along with an associated sync pulse on conductor $\mathbf{61}_1$. Since only AND gate $A_{11}$ is conditioned in channel 1 at this time, this 1 bit is inserted into register stages $S_{11}$. Immediately thereafter, the synchronizing pulse is applied via $K_1$ to one input of AND gate $B_{11}$. Inasmuch as memory trigger $M_{61}$ has previously been set, $B_{11}$ is conditioned to pass this synchronizing pulse to place trigger $M_{11}$ in its set condition, thus indicating that its associated register stage $S_{11}$ now contains binary information. The placing of $M_{11}$ in a set condition causes a signal to be applied to AND gate $A_{21}$ to which is further applied a signal from the reset terminal of memory element $M_{21}$. The setting of trigger $M_{11}$ occurs after the track 1 bit of character 12 disappears, but AND gate $A_{21}$ will now be conditioned to receive the track 1 bit of character 14. The set output of $M_{11}$ also passes through a small delay $O_{21}$ in order to condition AND gate $B_{21}$ to pass the synchronizing pulse appearing next on conductor $\mathbf{61}_1$ which is that associated with the track 1 bit of character 14. Although memory element $M_{61}$ is not reset immediately subsequent to the filling of register $S_{11}$, it will be noted that no further information can be entered into stage $S_{11}$ because the reset output of $M_{11}$ is now absent.

Upon transducer $T_1$ sensing the track 1 bit (0) of character 14, a similar operation occurs in that this bit is effectively placed in stage $S_{21}$ by maintaining same in its reset condition and by setting the associated memory element $M_{21}$. Information bits sensed at intervals 3 through 9 in FIGURE 3 are likewise placed in their respective channel register stages in the manner indicated above. Upon sensing the track 4 bit of character 12 at interval 10, both register stage $S_{14}$ and element $M_{14}$ are set. And gate $D_1$ therefore detects coincidence of all its input signals and provides a gating output signal to read-out register stages $S_{11}$ through $S_{14}$ via their respective read-out gates $E_{11}$ through $E_{14}$. At the same time, the output from $D_1$ is applied to the reset terminals of all of the register stages $S_{61}$ through $S_{64}$, and to the memory elements $M_{61}$ through $M_{64}$. Although the register stages $S_6$ are already in their reset condition, the memory elements $M_6$ are reset to discontinue an output from AND gate $D_6$. It may therefore be seen from part B of FIGURE 6 that the first character 12 is gated from the skew correcting circuits at interval 10, corresponding with the time in which the same character is gated in FIGURE 4.

The track 1 bit of character 20 sensed at time 11 in FIGURE 3 is now inserted into register stage $S_{51}$ in FIGURE 5, instead of into stage $S_{11}$ as in FIGURE 4. Further, the track 1 bit of character 22 is placed in register stage $S_{61}$ instead of into stage $S_{21}$. However, prior to the sensing of the track 1 bit of character 22, the track 4 bit of character 14 has been sensed, which thus causes AND gate $D_2$ to reset memory elements $M_{11}$ through $M_{14}$. Therefore, by the time that a bit is available for insertion in stage $S_{61}$, the signal from AND gate $D_1$ has disappeared so that it no longer is applied to the reset terminal of state $S_{61}$. A similar condition is observed at the time that the track 1 bit of character 24 is sensed, inasmuch as the output from AND gate $D_2$ has been terminated due to the read-out of character 16 from register stages $S_{31}$ through $S_{34}$.

It should therefore be appreciated that the mode of operation of FIGURE 1, as exemplified by FIGURES 4 and 5, provides register stages in each channel having both parallel read-in and read-out gates for holding corresponding order bits of successive characters, until all bits of a particular character are stored in the circuit. Means are provided in each of the embodiments of FIGURE 4 and 5 to determine when corresponding register stages in each channel have been filled with information, so that they may then be examined. In FIGURE 4, the circuits C provide the loading sequence for the register stages, while registers M provide merely a memory function. In FIGURE 5, however, the combination of the set and reset conditions of memory elements M provide the sequence function, with the set condition of elements M providing memory.

FIGURE 2 of the drawings shows a second embodiment of the present invention having a slightly different mode of operation from that shown in FIGURE 1 and by FIGURES 4 and 5. As in FIGURE 1, the dark lines in FIGURE 2 indicate information paths, while the light lines indicate paths for control signals. Binary bits sampled by each transducer in FIGURE 3 are applied in serial fashion to information channels $70_j$, while synchronizing pulses associated with binary bit intervals are applied on conductors $71_j$. A group of read-in gates $72_j$ accepts the serial information bits on conductor $70_j$ and selectively places each in a respective one of a plurality of register stages $73_j$ as is indicated by the multiple conductor cable N connected between gates $72_j$ and register stages $73_j$. The particular register stage selected is determined by the condition of a sequence circuit $74_j$ which is changed by each synchronizing pulse on conductor $71_j$. In this respect, the circuit of FIGURE 2 is the same as that shown in FIGURE 1, inasmuch as a serial train of information bits appearing from a track transducer is placed in selected channel register stages in parallel fashion.

Read-out of information from a group of register stages $73_j$ is accomplished from only one particular stage therein. This is indicated by the single output conductor. The stages $73_j$ are therefore connected together as a shift register so that an information bit placed in any register stage N therein may be successively shifted from stage to stage until it eventually reaches the read-out stage. The shifting operation is controlled by means of a single conductor from a single comparison gate 75 having inputs derived from a single memory element $76_j$ in each of the channels. Each memory element $76_j$ is associated merely with the terminal read-out stage in its channel, and by its setting indicates that this stage is filled with information and ready for interrogation. The sequencer $74_j$ must also take into account the fact that after each shift operation, the register stage last filled by it is now empty because its bit information is transferred to the adjacent register stage in the direction of the shift. Therefore, sequencer 74 must be conditioned to place the next information bit following a shift operation into this now empty register stage. This procedure prevents any empty stages from occurring between filled stages.

As long as the read-out stage of group $73_j$ is filled with information, whether it be placed there from read-in gates 72 or from the adjacent register stage during a shift operation, memory element 76 maintains an output to the single comparison gate 75. Thus, when the read-out stage in each of the channels is filled with information, an output from comparison gate 75 causes said channel read-out stages to be sensed for their information. At the same time, information bits held in the other register stages are shifted one position so as to replace said information in the read-out stage with a new bit. If there are no information bits held in the adjacent stages of a channel, then a shift operation in that channel will result in the read-out stage being reset to an empty condition. In this case, its associated memory element $76_j$ indicates the empty condition and so deconditions the comparison gate 75 until information is placed into the read-out stage via conductor $70_j$.

It may therefore be seen that the binary bits read from a channel register group all appear on the channel output conductor in the same sequence observed on the storage track associated with the channel. For example, the track 1 bits of characters 12, 14, 16, 18, etc. appear in that order from the channel 1 read-out register stage during successive read-out times. Since all channel read-out stages are sampled during a read-out time, then the bits read therefrom must belong to and comprise the same character. It is not necessary in the embodiment of FIGURE 2, however, that each channel contain the same number N of register stages if the skew angle of the sensed bit pattern is assumed to remain relatively constant. For example, as can be seen from FIGURE 3, the maximum number of register stages filled at any time in each of the channels 1, 2, 3, and 4 is four, three, two, and one, respectively. Since each sequencer begins to fill its associated empty register stages in order commencing with the read-out stage, then only one stage would ever be used in a channel responsive to track 4 bits of FIGURE 3, while two and three stages are needed only in channels 3 and 2, respectively. However, if the skew angle is expected to be variable, then the number of register stages in the outer channels should be sufficient to handle all of the anticipated conditions, although the number of stages in the center channels normally may be less. For these reasons, then, the letters N in FIGURE 2 have channel subscripts associated therewith to indicate possible different values.

Figure 7:
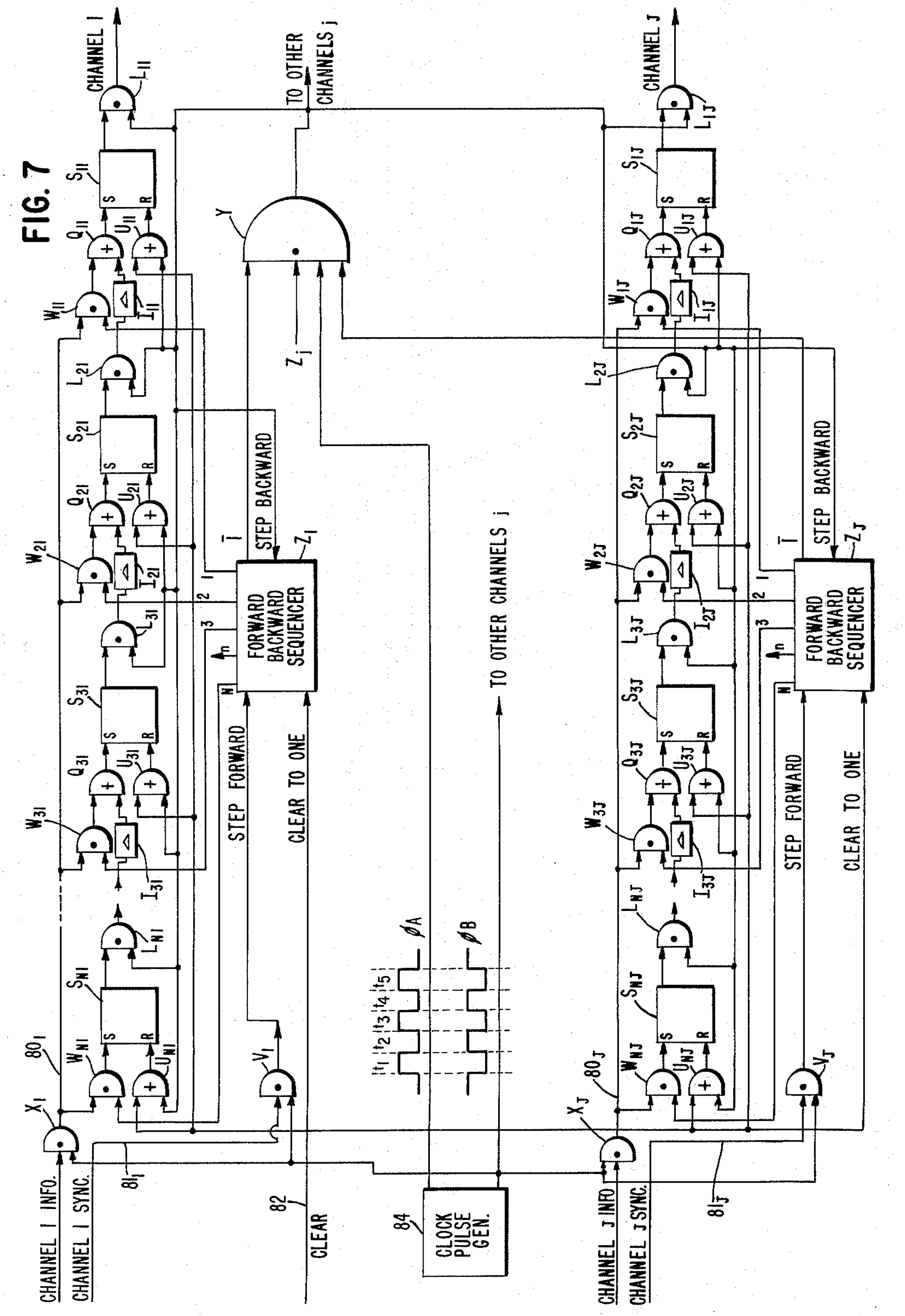
FIGURE 7 shows details of FIGURE 2.

FIGURE 7 of the drawings shows the details of an embodiment having the mode of operation illustrated in the block diagram of FIGURE 2. Each channel of the skew correcting circuit includes a group of register stages $S_{1j}$ through $S_{Nj}$ for the storage of successive information bits arriving on input conductor 80$_j$. However, as indicated above, each channel need not necessarily contain the same number N of register stages S. Therefore, subscripts are utilized with each letter N in order to indicate that the number of stages and read-in gates may differ in each channel. A forward backward sequence circuit $Z_j$ is associated with each channel to determine into which stage $S_n$ an information bit is to be placed. A group of input AND gates $W_{1j}$ through $W_{Nj}$ is provided each of which is selectively conditioned by one of the outputs from the circuit $Z_j$ to pass therethrough an information bit occurring on conductor 80$_j$. Each circuit $Z_j$ has a "step forward" input which, upon receipt of synchronizing pulses, advances the circuit in one direction. A "step backward" input is also provided which, upon receipt of a read-out pulse, steps the sequence circuit in the opposite direction. A clear input to each circuit is also provided for resetting same to a reference state of prior to the sensing of characters from the storage medium. A sequence circuit may be forward-backward counter, a reversible shift register, or many other different kinds of reversible commutator which can be found in the prior art.

Emerging from each circuit $Z_j$ are two leads 1 and $\bar{1}$ respectively, indicating an internal state of 1 or state other than 1. When circuit $Z_j$ has a signal on its output lead 1, thus conditioning its associated register stage $S_{1j}$ to receive an information bit via AND gate $W_{1j}$, then no signal appears on output $\bar{1}$. However, upon circuit $Z_j$ producing an output on any other lead besides 1, then a signal appears on its $\bar{1}$ lead. Therefore, a signal from terminal $\bar{1}$ indicates that stage $S_{1j}$ has been filled.

Each $\bar{1}$ conductor from circuit $Z_j$ is applied to a common AND gate Y which is conditioned to generate an output only when signals appear on all of its inputs, thus indicating that all stages $S_{11}$ through $S_{1J}$ have information bits therein. The output from AND gate Y is applied to a set of read-out gates $L_{11}$ through $L_{1J}$ which sample the contents of their associated register stages $S_{11}$ through $S_{1J}$. The output from AND gate Y is also directed to the reset terminals of each of the register stages $S_{nj}$ in all of the channels via a set of OR gates $U_{nj}$. For example, the output from AND gate Y is directed to OR gates $U_{11}$ through $U_{N1}$. Therefore, each register stage in a channel is reset upon occurence of coincident signals at AND gate Y, while the readout stages $S_{11}$ through $S_{1J}$ in each channel are sampled and their contents fed to further utilization circuitry not shown. At the same time that the register stages $S_{nj}$ are reset, the output signal from gate Y also is applied to a series of read-out AND gates $L_{2j}$ associated with the remaining register stages $S_{2j}$ through $S_{Nj}$ in each channel. The output from each of these read-out AND gates is applied to the set input of the adjacent register stage $S_{(n-1)j}$ via a set of OR gates $Q_1$ through $Q_{(N-1)}$. Each group of register stages $S_{nj}$ in each channel is therefore connected in shift register fashion such that upon the occurrence of a signal from AND gate Y, all the information bits in a register stage group are shifted right.

A delay unit $I_{nj}$ is associated with and is individual thereto each of the stages $S_{1j}$ through $S_{(N-1)j}$, and is connected between the output of AND gate $L_{(n+1)j}$ and one of the inputs to OR gate $Q_{nj}$. Its purpose is to insure that the stage $S_{nj}$ is reset to its empty condition prior to the entrance of a 1 bit from stage $S_{(n+1)j}$. Furthermore, although not specifically shown in FIGURE 7, a group of delay units similar to $R_{nj}$ in FIGURE 4 might be necessary to insure that each stage $S_{nj}$ is sampled at AND gate $L_{nj}$ prior to being reset by the signal from AND gate Y. Likewise, if the response time of circuit $Z_j$ is quite rapid when pulsed at its "step forward" terminal by a sync pulse, a delay similar to delay $K_j$ in FIGURE 5 may be necessary to insure that circuit $Z_j$ does not change stages until after the information bit has been placed into the appropriate register stage. It may therefore be appreciated that the only register stage in a channel from which information is retrieved is the first stage $S_{1j}$ into which all bits will eventually be placed prior to their extraction therefrom.

At the same time that a shift operation is initiated in a register stage group, the forward-backward circuit $Z_j$ must be controlled such that it will subsequently condition the read-in gate $W_{nj}$ of the unfilled stage $S_{nj}$ nearest stage $S_{1j}$. For example, if information bits in channel 1 are contained only in stages $S_{11}$, $S_{21}$, and $S_{31}$ immediately prior to a shift operation, then stage $S_{31}$ will be empty immediately subsequent thereto because it will have received no information from the adjacent stage $S_{41}$. In such an event, an information bit subsequently appearing on conductor 81$_j$ should be inserted into now empty stage $S_{31}$. If counter $Z_j$ happens to be resting in a state of 4 at the time of shifting, then it must be stepped in a reverse direction to return to a count of 3 in order to so condition AND gate $W_{31}$. Since shift operations occur simultaneously in all channels, each counter $Z_j$ must be similarly controlled. Therefore, the output from AND gate Y is applied to all of the "step backward" terminals of the counters $Z_j$ so as to condition each to insert a subsequent information bit into the right most unfilled register stage.

Since certain binary patterns on the storage medium can result in the simultaneous sensing of information bit areas in two or more tracks, there might be occasions when either an information bit or conductor 80$_j$ or a "step forward" pulse to circuit $Z_j$ appears simultaneously with a "shift" and "step backward" pulse from AND gate Y. Such would be the case, for example, if the track 3 bit of character 16 and the track 4 bit of character 14 both pass under respective transducers $T_3$ and $T_4$ at about the same time, with the latter being the final sensed bit of character 14 so that read-out thereof can occur. To avoid the situations where a sequencer $Z_j$ is apt to be stepped backward in the middle of inserting information into a stage $S_{nj}$, or where said sequencer may have pulses applied concurrently to its two inputs, circuitry is provided in FIGURE 7 to clock the information and sync pulses at a time different from that in which a shift pulse appears. AND gates $X_j$ and $V_j$ are provided in each channel for the information conductor 80$_j$ and sync conductor 81$_j$, respectively. A source 84 generates two trains of clock pulses with one being 180° out of phase with the other, such as indicated by OA and OB. The positive portions of the phase B(OB) clockpulses are used to condition gates $X_j$ and $V_j$ in each channel to pass all or a portion of a signal appearing on their associated input conductors. For this reason, the frequency of the clockpulse trains should be rather high so that a positive cycle thereof is bound to overlap once a signal representing an information bit and/or sync bit in order to allow same to activate a trigger $S_{nj}$ and sequencer $Z_j$. However, the frequency should not be so high as to cause the OB train to sample the same signal more than once. The phase A(OA) clockpulse train is used to condition AND gate Y to generate a signal if all other inputs thereto from the $\bar{1}$ sequencer outputs are also present. Because the OB train is out of phase with the OA train, there is no chance that a "shift" and "step backward" pulse from gate can occur at the same instant that pulses are applied to a trigger $S_{nj}$ or to the "step forward" terminal of sequencer $Z_j$.

Figure 8:
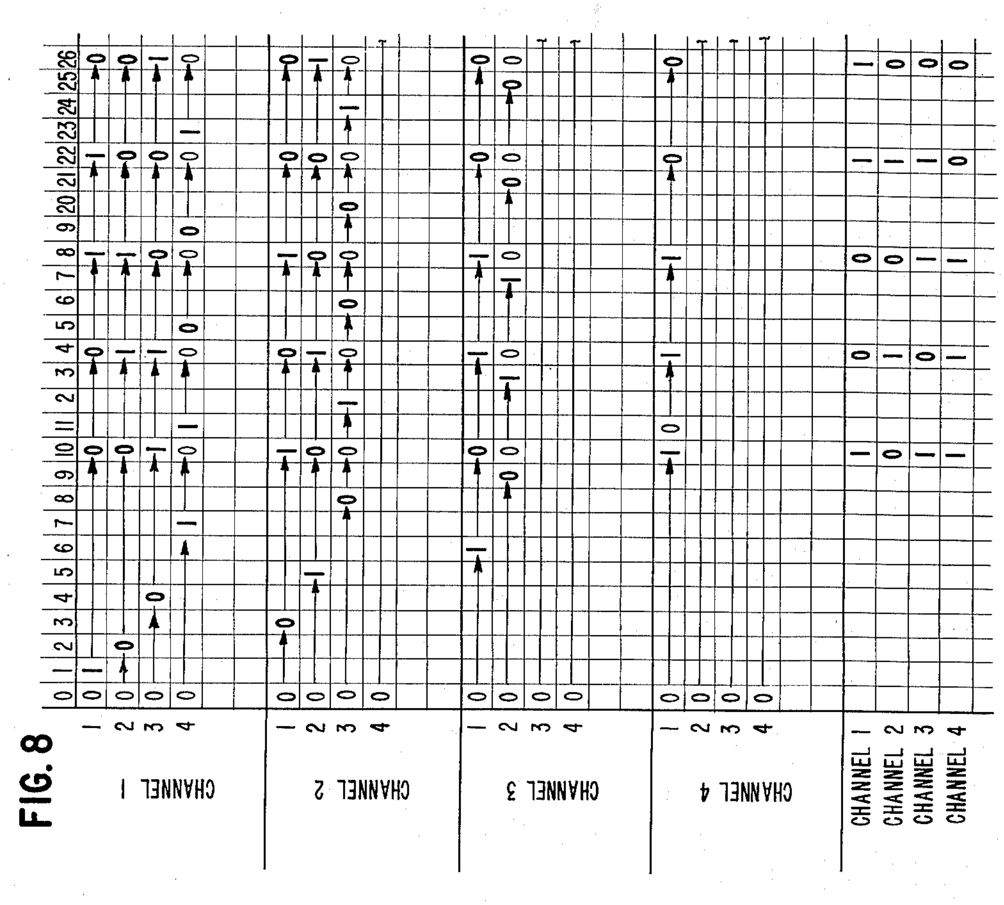
FIGURE 8 illustrates in tabular form the operation of FIGURE 7.

The operation of FIGURE 7 will now be briefly described with reference also being made to FIGURE 8 of the drawing which shows the contents of each register stage $S_{nj}$ at different intervals when the binary pattern of FIGURE 3 is being scanned. The legend of FIGURE 8 is the same as that described for FIGURE 6. Initially, a clear pulse is applied to conductor 82 to reset sequences $Z_1$ through $Z_4$ to a state of 1, whereupon AND gates $W_{11}$ through $W_{14}$ are conditioned to receive information bit pulses (representing binary 1's from the pattern) at phase OB times via conductors $80_1$ through $80_4$, respectively. The first bit to be sensed is the track 1 bit of character 12 which is thereupon placed in $S_{11}$ and whose associated sync pulse steps sequence circuit $Z_1$ to a state of 2. The $\bar{1}$ conductor of $Z_1$ thus has a signal generated thereon.

The operation of the channel circuits continues as described above for the sensing of the second through ninth bits in FIGURE 3, where said ninth bit is the track 3 bit of character 14. Up to and including this interval, not all of the $Z_j$ circuits have as yet been stepped from the state of 1, so that not all inputs have been applied to AND gate Y as is required. Upon the track 4 bit of character 12 being sensed, it is placed in $S_{14}$ and $Z_4$ subsequently stepped to a state of Z. Thereupon, signals are applied to all of the $\bar{1}$ inputs to AND gate Y, and upon the next subsequent positive cycle of the OA clock-pulse train, a signal is generated therefrom. This signal reads out the bits of character 12 from register stages $S_{11}$, $S_{12}$, $S_{13}$, and $S_{14}$ via respective AND gates $L_{11}$, $L_{12}$, $L_{13}$, and $L_{14}$. A shift right operation is also performed during which the following occurs: in channel 1, the track 1 bit of character 14 moves from $S_{21}$ to $S_{11}$, the track 1 bit of character 16 moves from $S_{31}$ to $S_{21}$, and the track 1 bit of character 18 moves from $S_{41}$ to $S_{31}$; in channel 2, the track 2 bit of character 14 moves from $S_{22}$ to $S_{12}$, and the track 2 bit of character 16 moves from $S_{32}$ to $S_{22}$; in channel 3, the track 3 bit of character 14 moves from $S_{23}$ to $S_{13}$; and in channel 4, stage $S_{14}$ is reset to zero with no information being placed therein from $S_{24}$.

Immediately prior to the above signal from AND gate Y, sequencers $Z_1$, $Z_2$, $Z_3$, and $Z_4$ have respective state of 1, 4, 3, and 2. $Z_1$ is in state 1 because of recycling from state 4 to state 1; however, its range could be increased to include five states if desired. When the above mention pulse is generated from AND gate Y, then each circuit $Z_1$ through $Z_4$ is stepped once in reverse, resulting in new states of 4, 3, 2, and 1, respectively. This causes the $\bar{1}$ signal from $Z_4$ to disappear which consequently results in AND gate Y being de-energized. The track 1 bit of character 20 will subsequently be placed in now empty stage $S_{41}$. In view of the above, the further operation of FIGURE 7 is thought to be obvious.

While preferred embodiments of the invention have been shown and described, it is obvious that many modifications can be made thereto without exercise of invention by one skilled in the art. For example, by providing additional stages in FIGURE 4 over and above the number required for maximum pattern skew, the output of a gate $D_n$ might be used to gate out other filled register stages besides $S_n$.

Thus, the intended scope of the present invention is to be ascertained from the appended claims.

We claim:

1. A circuit for aligning successive sets of related binary information signals where each of said signals appears on a different one of a plurality of information channels and is also accompanied by a synchronizing signal appearing on an associated synchronizing channel, said circuit comprising the combination of: a N stage register for each information channel separate, sequence means for each information channel selectively settable to transfer each binary information signal thereon into register for each information channel, separate sequence means setting, said sequence means being connected with the associated synchronizing channel so as to have its setting changed in one direction by each synchronizing signal appearing on the associated synchronizing channel, separate first means for each information channel and individual solely thereto to indicate that a register stage thereof is filled with binary information, second means common to all of said channels and responsive to a coincidence of related first means indications one from each channel to generate a readout indication, and third means responsive to the said readout indication to read out the binary information stored in related filled register stages one in each channel.

2. A circuit according to claim 1 in which said read-out related channel register stages are respectively associated with the said related first means.

3. A circuit according to claim 1 wherein each of said channel first means comprises a group of two state elements each associated with a different one of said channel register stages, and each responsive to the setting of said channel sequence means and to a synchronizing pulse for being set to a state indicating the fill of its associated register stage, and said second common means comprises a group of coincidence detecting means each associated with a different set of related two-state elements in different channels.

4. A circuit according to claim 3 in which the said readout related channel registers are respectively associated with the set of related two-state elements whose coincident indications cause said read-out to occur.

5. A circuit according to claim 1 wherein each of said channel first means comprises a group of two state elements each associated with a different one of said channel register stages and each indicating the fill thereof when in a second state, each of said channel sequence means includes said group of two-state elements together with a group of gate means each being responsive to a first state of one element and a second state of another element for gating in a binary information signal to the associated register stage of said one element, with each gate means also being responsive to the second state of said another element and a synchronizing signal for setting said one element to its second state, and said second common means comprises a group of coincidence detecting means each associated with a different set of related two-state elements.

6. A circuit according to claim 5 in which the said read-out related channel registers are respectively associated with the set of related two-state elements whose coincident indications cause said read-out to occur.

7. A circuit according to claim 2 wherein each of said channel multistage registers is connected as a shift register, each of said channel sequence means is adapted to have its setting changed in the opposie direction, each of said channel first means comprises a single means associated with only one register stage of its associated shift register, said second common means includes one coincidence detecting means associated with all of channel first means, and means are further provided in each channel to shift information in said shift register while changing the setting of said channel sequence means in the opposite direction each time that said one register stage is read out.

8. A circuit according to claim 7 wherein the number N of register stages may vary in different channels.

9. A circuit for aligning successive sets of related binary information signals where each of said signals appears on a different one of a plurality of information channels and is also accompanied by a synchronizing signal appearing on an associated synchronizing channel, said circuit comprising the combination of: a multi-stage register for each information channel, sequence means for each information channel selectively settable to transfer each binary information signal thereon into any one of said register stages according to said sequence means setting, said sequence means being connected with the associated synchronizing channel so as to have its setting changed by each synchronizing signal appearing on the associated synchronizing channel, a group of two state elements for each information channel, with each element of a group being associated with a different one of said channel register stages to indicate that said register stage is filled with binary information, a group of coincidence detection means each associated with a different set of related two state elements one in each of said channels, where each detection means is responsive to a coincidence of indications from all of its associated elements to read out the binary information stored in related filled register stages one in each channel.

10. A circuit according to claim 9 in which said read-out related channel registers are respectively associated with the set of related two-state elements whose coincident indications cause said read-out to occur.

11. A circuit according to claim 10 wherein an output from a coincidence detector associated with a set of related two-state elements is also used to subsequently clear the channel register stages associated with said set.

12. A circuit for aligning successive sets of related binary information signals where each of said signals appears on a different one of a plurality of information channels and is also accompanied by a synchronizing signal appearing on an associated synchronizing channel, said circuit having for each of said channels, a multi-stage register, a group of two-state elements each associated with a different one of said channel register stages, a first group of gate means each being responsive to a first state of one element and a second state of another element for gating in a binary information signal to the associated register stage of said one element, a second group of gate means each being responsive to the second state of said another element and a synchronizing signal for setting said one element to its second state thus indicating the fill of its associated register stage, said circuit also having in common with all of said channels a group of coincidence detection means each associated with a different set of related two-state elements one in each of said channels, where each detection means is responsive to a coincidence of second state indications from all of its associated elements to read out the binary information stored in related filled register stage one in each channel.

13. A circuit according to claim 12 in which said read-out related channel register stages are respectively associated with the set of related two-state elements whose coincident indications cause said read-out to occur.

14. A circuit according to claim 13 in which the output from a coincidence detector associated with a set of related two-state elements is also used to clear the channel register stages associated with a different one of said sets.

15. A circuit for aligning successive sets of related binary information signals where each of said signals appears on a different one of a plurality of information channels and is also accompanied by a synchronizing signal appearing on an associated synchronizing channel, said circuit having, for each of said channels, a N-stage shift register having one read-out stage therein in the direction of shift a reversible sequence means selectively settable to directly transfer each binary information signal on said read channel into any one of said register stages beginning with said read-out stage according to said sequence means setting, said sequence means being connected with the associated synchronizing channel so as to have its setting changed in a forward direction by each synchronizing pulse, means to indicate when said read-out stage is filled with binary information, said circuit also having in common with all of said channels a single coincidence detecting means associated with each of said channel indicating means and responsive to a coincidence of indications from all to read out the binary information from said channel read-out stages, to initiate one shift step in each of said channel shift registers, and to change the sequence means setting in a reverse direction.

16. A circuit according to claim 15 in which the number N of register stages may vary in different channels.

17. A circuit according to claim 15 wherein interlock means are further provided to prevent the simultaneous occurrence of both a shift operation and a register stage read-in operation, said last mentioned means further preventing the simultaneous occurrence of both a sequence means forward change and a sequence means reverse change.

18. A circuit according to claim 17 wherein said interlock means includes a clockpulse source generating first and second clock pulse trains of the same frequency but one-half cycle out of phase with each other, gating means in each of said information and synchronizing channels conditioned by said first clockpulse train, with said coincidence detecting means being conditioned by said second clockpulse train.

19. A circuit according to claim 18 in which the number N of register stages may vary in different channels.

References Cited by the Examiner

UNITED STATES PATENTS

| | | | |
|---|---|---|---|
| 2,921,296 | 1/60 | Floros | 340—174.1 |
| 2,970,300 | 1/61 | Witt et al. | 340—174.1 |

IRVING L. SRAGOW, *Primary Examiner.*